United States Patent [19]
Gagnon et al.

[11] Patent Number: 5,559,673
[45] Date of Patent: Sep. 24, 1996

[54] DUAL FILTERED AIRFLOW SYSTEMS FOR COOLING COMPUTER COMPONENTS, WITH OPTIMALLY PLACED AIR VENTS AND SWITCHBOARD CONTROL PANEL

[76] Inventors: Kevin M. Gagnon, 1668 Larwood Rd., Lemon Grove, Calif. 91945; Victor H. Goulter, 485 Molimo Dr., San Francisco, Calif. 94127-1655

[21] Appl. No.: 299,293
[22] Filed: Sep. 1, 1994
[51] Int. Cl.⁶ .................................................. H05K 7/20
[52] U.S. Cl. ...................... 361/695; 165/122; 361/687; 454/184
[58] Field of Search ................................. 62/259.2, 418; 454/184; 165/122, 126, 80.3; 361/687, 689, 690, 695, 724; 174/16.1; 257/712, 713, 721, 723, 724

[56] References Cited

U.S. PATENT DOCUMENTS

| | | | |
|---|---|---|---|
| 2,380,026 | 7/1945 | Clarke | 361/695 |
| 3,967,874 | 7/1976 | Calabro | 361/384 |
| 5,136,465 | 8/1992 | Benck et al. | 361/384 |
| 5,202,816 | 4/1993 | DeWilde | 361/384 |
| 5,210,680 | 5/1993 | Scheibler | 361/384 |
| 5,218,514 | 6/1993 | Huynh | 361/384 |
| 5,237,484 | 8/1993 | Ferchau | 361/689 |
| 5,422,787 | 6/1995 | Gourdine | 361/697 |

OTHER PUBLICATIONS

"Data . . . Floor", Research Disclosure, Apr. 1986, #26472, Kenneth Mason Publ. England.

Primary Examiner—Gerald P. Tolin
Attorney, Agent, or Firm—Jeffrey P. Aiello; James J. Leary

[57] ABSTRACT

A cooling system for cooling electrical components in a personal computer is provided. The cooling system provides filtered air under a positive air pressure to such components in the computer, as the electrical power supply and microprocessor, as well as other components in the computer. The filtered air cools the components and prevents dust from collecting on the components. In a second embodiment, the cooling system includes a tower style case for supporting the personal computer. The case houses an air filter and induction fans, for providing copious cooling air flow through ducts in the computer. Air vents are placed in optimal areas in the computer, such as near the microprocessor and power supply, to provide increased air circulation for the components in these areas. A switch panel is additionally provided that enables energizing peripheral devices when desired.

7 Claims, 9 Drawing Sheets

FIG 1, (PRIOR-ART)

FIG 2, (PRIOR-ART)

DUAL FILTERED AIRFLOW SYSTEMS FOR COOLING COMPUTER COMPONENTS, WITH OPTIMALLY PLACED AIR VENTS AND SWITCHBOARD CONTROL PANEL

BACKGROUND—FIELD OF INVENTION

The present invention relates to personal computers, in particular to a dust-free dual air-cooling system, using a positive air pressure, in conjunction with optimally placed air exit vents to obtain more practical cooling and air distribution to all components, together with a switchboard control system.

BACKGROUND—DESCRIPTION OF PRIOR INVENTION

Personal computer systems above laptop or notebook sizes are usually defined as desk top, or tower-style cases. They contain a system unit usually having a single system processor and associated volatile and non-volatile memory, along with a keyboard, a display monitor, diskette drives, a hard drive and, if desired, a printer.

These components are electrically connected together by the use of the distinguishing characteristics of a motherboard or planar system.

Personal computers are fitted with enclosures which provide the multiple functions of an attractive appearance, protecting the operating components of the computer, and shielding against undesirable electromagnetic emission. Heat generating operating components are contained or housed within the enclosure, in particular very large scale integrated circuits, called VLSI chips, and the newer ULSI (Ultra Large Scale Integration) which are used in personal computers have operating ranges of temperatures above which failure of the chip can occur.

One cooling system comprises an exhaust fan which expels air from within the computer enclosure to the outside. For example IBM's PERSONAL COMPUTER AT and IBM's PERSONAL SYSTEM/2 Systems are usually provided with a single exhaust fan which is contained within or adjacent the power supply portion of the system. Ambient air from outside the enclosure is induced through the floppy disc drive slots, tape back-up slots, CD ROMs and removable hard drive slots and through an air vent contained in the front panel. The above systems are generally referred to as Family 1 Models, which use a bus architecture exemplified by IBM PERSONAL COMPUTER AT and other "IBM compatible" machines. Family II models use IBM's MICRO CHANNEL bus architecture exemplified by IBM's PERSONAL SYSTEM/2. The Family 1 models typically have used the popular INTEL 8088 or 8086 microprocessor as the system processor. However, the more advanced computer uses INTEL 80286, 80386, and 80486 microprocessors, and the new PENTIUM chip, all of which generate more heat compared to the 8088 or 8086.

As stated above, a single exhaust fan is provided in or adjacent the power supply housing at the rear panel of the computer enclosure and induces air through various drive slots and an air vent situated in the front panel of the computer enclosure. The air passes through the computer enclosure and finally through the power supply housing, which is a principal heat source, and is exited to the outside ambient air by the exhaust fan.

Improving the operation of personal computers by upgrading existing machines through replacement of processors (i.e., replacing an 80286 or 80386 processor with an 80386 or 80486) results in the generation of more heat, increasing the thermal load on the single exhaust fan. To provide an increased air flow to deal with this increased heat, a fan was installed in the air vent at the front panel to operate in tandem with the exhaust fan installed in the power supply. This fan induced additional air into the enclosure, as taught by Benck et al. in U.S. Pat. No. 5,136,465, dated Aug. 4, 1992.

The pair of fans are located upstream and downstream (in air flow relation) of the heat generating components. The second or (exhaust) fan remains within or adjacent the power supply at the rear panel, while the first or inlet fan, is fitted in the opposite or front panel of the enclosure to induce ambient air directly through the air vent.

Many problems are associated with the "one exhaust fan system," and also with the "two fan system". Although the fans are provided to cool heat generating components within the enclosure, by creating an air flow through the enclosure, they inadvertently also cause these same components to become unreliable or fail, as will be explained below.

One Exhaust Fan System

With a one exhaust fan system it should be understood that by exhausting air out through the rear panel from within the computer enclosure, the fan will simultaneously induce ambient air into the enclosure from around the front panel.

One problem, with this type of cooling system, is that it is a 'negative' or 'low-pressure' air system. I.e. air is being expelled from inside the enclosure by the exhaust fan, therefore suction or low pressure inside the enclosure draws air in through any opening wherever air can enter, which is through the floppy optional device slots and air vent in the front panel.

The second problem is that the air being induced into the computer enclosure by the above system also induces dust, moisture, and any other unwanted air-borne micro-size particles that happen to be floating in the ambient air near the front panel.

Once inside the enclosure, the air is directed onto or comes into contact with heat generating and other components for the purpose of keeping the components within a desired operating temperature.

Two-Fan System

A two-fan system, in which an exhaust and an induction fan operate in tandem, further increases the airflow through the air vent, and the computer enclosure. Such a system is an improvement to the 'one' exhaust fan system, especially in relation to increased air flow, and enhanced cooling. It also helps to provide a more balanced air pressure system within the enclosure. However, the two-fan system also increases the dust input, as well as the moisture and unwanted air-borne micro-fine particles, which unavoidably enter along with the increased air flow. The dust eventually causes a third problem, which will be described below.

Although a personal computer usually leaves the factory in perfect working condition, and although few if any of its components are subject to wear or failure, computer breakdown has become a common problem. This problem affects and is costly to businesses and institutions of every size and description, causing expense and lost time.

When computers are "down," a repair technician has to be called in to diagnose, repair, or remove and replace all or part of the system.

I (Kevin Gagnon) have worked as a computer repair technician for three years. Invariably, when a computer comes in for diagnosis and repair, examination reveals layers of dust on every component throughout the enclosure and dust has collected within the moving parts of the drives. Sometimes all that is required is to carefully remove the dust, after which the computer works fine. Frequently, however, dust has encased a heat generating component to such a degree that the dust has become an effective heat insulator; in this case, the air cooling system cannot cool it sufficiently, the result being, the component has been ruined by overheating and must be replaced. The precautionary replacement of parts which the technician knows to be subject to such heat damage is a customary procedure, in order to ensure perfect operation when the unit is returned.

The cost of such labor is usually $80 per hour, aside from the cost of replaced parts, delivery and hook-up time.

Dust exists in the air wherever people and machines work. Although not visible, it is especially plentiful around the front of the computer enclosure where the user sits and operates the computer. When the power is switched on, dust laden air is immediately induced into the enclosure. From "day one" dust begins to settle and accumulate on every component, as the air stream meanders its way through the enclosure and releases its dust particles, forming a thin but effective heat insulating film around each component. Continued operation over a period of time provides a build-up of dust sufficiently thick and effective to thwart the cooling effects of air passing over and around it, thereby allowing parts to heat up beyond their safe operating temperature range, eventually resulting in failure.

Common Sources of Dust and Other Damaging Substance

There are many sources of dust around personal computers. Printers emit a steady stream of microfine paper dust particles. When printed paper is removed from dot matrix printers and the perforated edges torn off, minute bits of paper are released, which also happens when bank checks are torn from books and put in envelopes for mailing. When the desk top is dusted or the carpet is vacuumed, free dust is generated, which also happens when people walk across the room. Cigarette smoke and ash, particles of food, fragments of hair and skin, dandruff, body powders, etc. are shed by people as they work. Steam from hot cups of liquid (soup, tea, coffee) moisture laden air breathed out by workers, and perspiration all contribute moisture, which enters computer enclosures and adds to the stickiness of the dust.

Heat generating components are especially effected by moisture laden dust settling on them. The heat from the chips evaporates the moisture, which, over time, 'bakes' the sticky dust to the surface of the chip. In addition, cleaning with feather dusters and/or cleaning cloths or brushes disturbs any dust which has settled on desk tops, cabinets, lamp shades, book shelves etc., releasing it again into the air, from which it finds its way into the computer enclosure.

How Air Carries Dust

Under high velocity, wind picks up, gathers, and transports dust, as can be seen in dust storms and tornadoes. Conversely, air under relatively low velocity releases dust particles.

Thus, dust-laden air is carried into a computer under the velocity created by the induction fan. Once the dust has been carried in, however, the velocity diminishes. It is then progressively slowed by the maze of components, electric wires and cables within, thus producing a suitable "slow-moving-air" condition for dust particles to be released and to settle on surfaces and in crevices. This applies to all the components, (especially heat emitting chips) where it dries (bakes), forming, as we have described, a thin but very effective heat insulating film over and around the chips.

There is no other way for dust to enter the computer enclosure except by fans inducing dust-laden ambient air into the enclosure through the various disc slots and air vent. There is no guarantee that all of the dust carried into the computer enclosure by the induced air will be carried out again. At least some of it will remain and become attached to the heat generating components and-also all other components within the computer enclosure.

Over time, enough dust will collect on critical components to prevent adequate cooling, followed by computer break down.

Clearly, the present air cooling system employed by manufacturers of personal computers is temporarily effective, but it ultimately leads to the destruction of the very heat generating components it was installed to protect.

I (K. Gagnon) am experienced in repairing both single and twin fan 'tandem' airflow systems, including IBM's, and I am familiar with how layers of dust cause components to break down and fail. I have seen dust settled on tapes used in tape backup systems and CD-ROM drives that have rendered them useless until professionally cleaned.

Another problem with prior-art air cooling systems is that at least some of the components are situated in remote corners in relation to 'point of entry' of cooling air, and thus do not receive adequate circulation. Adequate circulation is required for sufficient fresh air to come into contact with every component to keep the heat at a tolerable level.

Objects and Advantages

Accordingly, several objects and advantages of the present invention are 1) to provide an air cleaning system which is also an air cooling system, 2) to provide a cooling system which induces no foreign particles such as dust into the computer enclosure, 3) to provide separate airflow systems for the power supply, without changing the existing component arrangement and power supply housing, 4) to provide a separate airflow system for the other computer components housed within the computer enclosure, 5) to provide an air filtering component which removes microfine dust, 6) to provide an air filtering component which receives air distanced from the area where moisture, dust, and unwanted micro-fine particles are more likely to exist.

Further objects and advantages are: 7) to provide an airflow having a sufficiently large capacity to maintain a 'positive pressure' in the computer enclosure, 8) to provide a cooling system which provides adequate cooling and clean air for all components at all times, 9) to provide a cooling and cleaning dual airflow system for much larger and/or greater heat generating capacity chips, such as the PENTIUM CHIP, 10) to provide a dual clean airflow cooling system distributed by conveying tubes or conduit housed within the computer enclosure, 11) to provide a 'positive air pressure' within the cabinet to ensure no foreign particles can enter the enclosure. 12) to provide a dual airflow system for cooling the power supply with clean air and cooling power supply components separately from other components, 13) to provide a system which is not limited to personal computer systems, 14 to provide an all-in-one unit, incorporating tower style case and computer enclosure unit having all the objects and advantages of the present invention.

Still further objects and advantages are: 15) to provide a cleaning and cooling system in which the filters can be removed and changed, 16) to provide an airflow system which does not induce air inwardly through the floppy disc slots, or tape drives, CD ROM drives etc., 17) to provide an airflow which blows filtered air outwardly through the floppy disc slots, tape drives, CD ROM drives etc., 18) to provide a filtered air supply housing, which doubles as an attractive personal computer support stand, 19) to provide twin air delivery fans which provide adequate clean air for a personal computer even if one fan became inoperative, or if the power supply fan becomes inoperative. 20) to provide a cleaning and cooling dual airflow system which has flexible air delivery conduit passageways within the computer enclosure, and/or alternatively, 21) which has rigid air conduit passageways within the computer enclosure, 22) to provide a cleaning and cooling system which can enhance airflow toward and around components which are located in remote areas or corners within the computer enclosure, or to enhance airflow toward and around specific components in any part of the computer housing, 23) to provide a switch board which includes a safety electrical switch-on system in which the cooling system is energized automatically with the computer start-up system, 24) to provide a system wherein other peripheral systems can be energized individually of the cooling and computer system, 25) to provide a clean-air cooling system which prevents damage to components therefore, avoids breakdowns, costly repairs, loss of time and disruption to all manner of industry and in the private sector.

Figure 1:
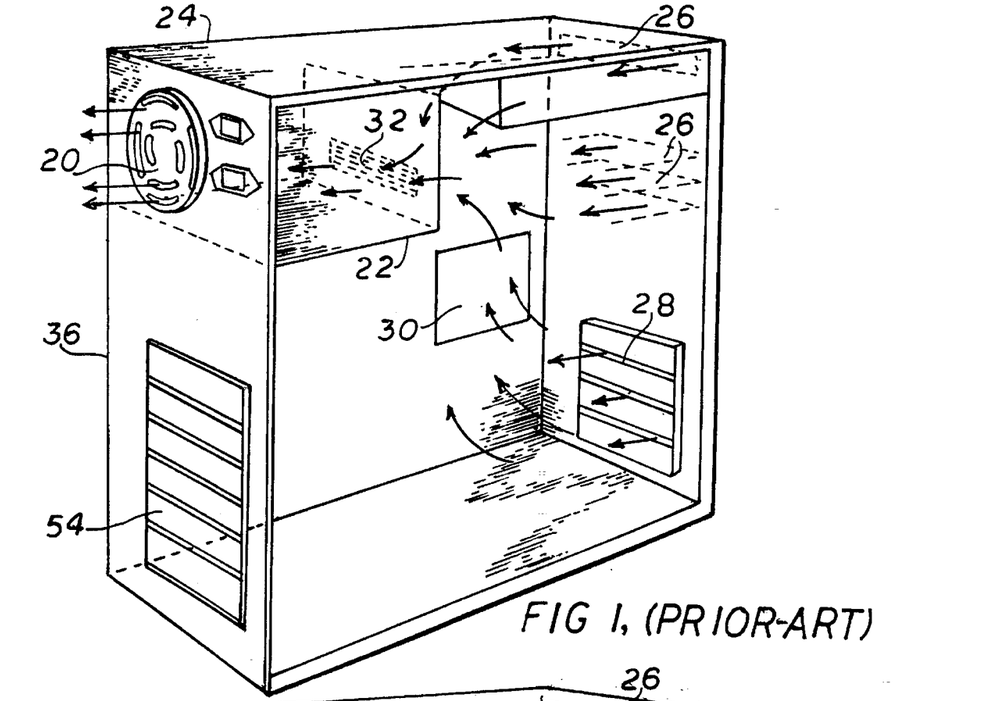
FIG. 1 is a perspective view of a Prior-Art personal computer having a single exhaust fan system, with side shown removed for clarity.
Figure 2:
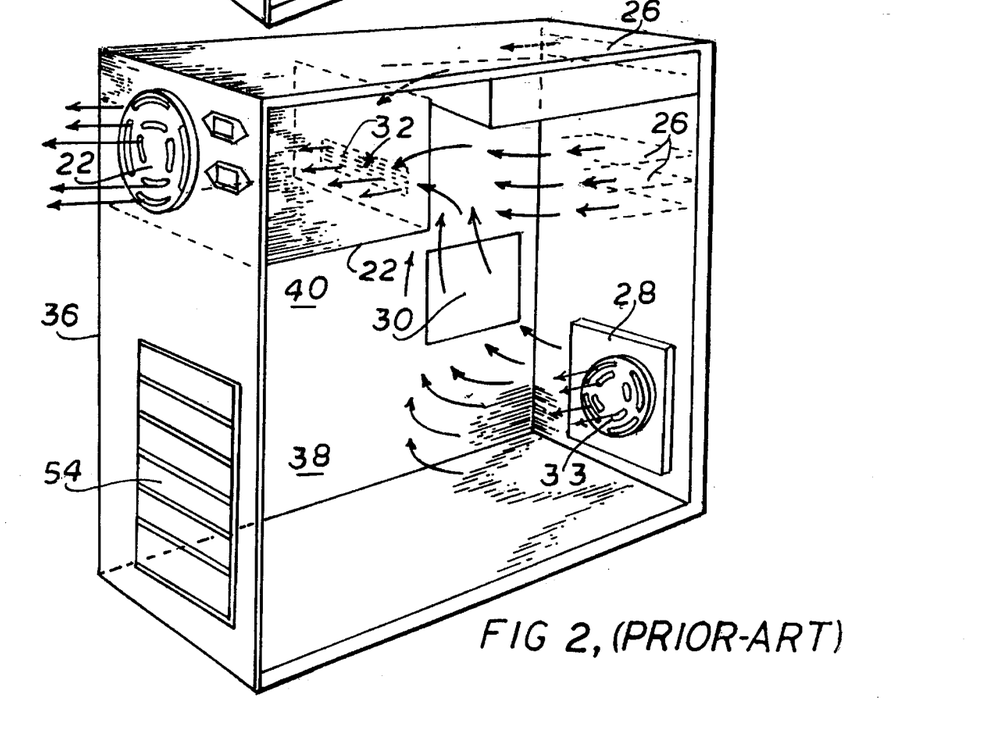
FIG. 2 is a perspective view of a Prior-Art personal computer having a two fan system; an induction fan working in tandem with an exhaust fan, with side shown removed for clarity.

DESCRIPTION OF PRIOR-ART—FIGS. 1 AND 2

FIG. 1 shows the airflow system of a personal computer, having one exhaust fan 20, which is housed generally within or near the power supply cage 22. Air is first induced into the computer enclosure 24 through disc slots 26, and an air vent 28. After entering the computer enclosure, the air passes via heat generating microprocessor usually located at 30 and then through a grill 32 in the wall of power supply housing cage 22. Housing 22 surrounds heat generating components, which provide the power supply for the computer. It is through this housing that all of the air which is induced into the computer enclosure finally passes before it is exited by exhaust fan 20.

FIG. 2, shows a prior-art, double fan system in which an additional fan 33 is fitted in air vent 28, in order to induce more air to flow through the computer enclosure. The two fans, operate in tandem in an upstream and downstream (in airflow relation) and are named accordingly, as first and second fan.

Some of the air entering via additional fan 33 will pass via the microprocessor usually installed at 30, (FIG. 2), thereby providing improved cooling of this heat generating component. However, the heated air being near grill 32 will be attracted to flow in that direction and will enter the power supply housing, which requires cool air, rather than heated air from the microprocessor.

Many of the components are placed in more remotely positioned areas, shown at 38 and 40 (FIG. 2) under the power supply housing 22, toward the rear of the enclosure and so will receive diminished supplies of airflow, thus less effective cooling, and more dust collecting due to the lack of velocity in the airflow. Dust laden air which does reach components located in these corners, will deposit a greater percentage of its dust due to the lack of air velocity around and through those parts.

Figure 3:
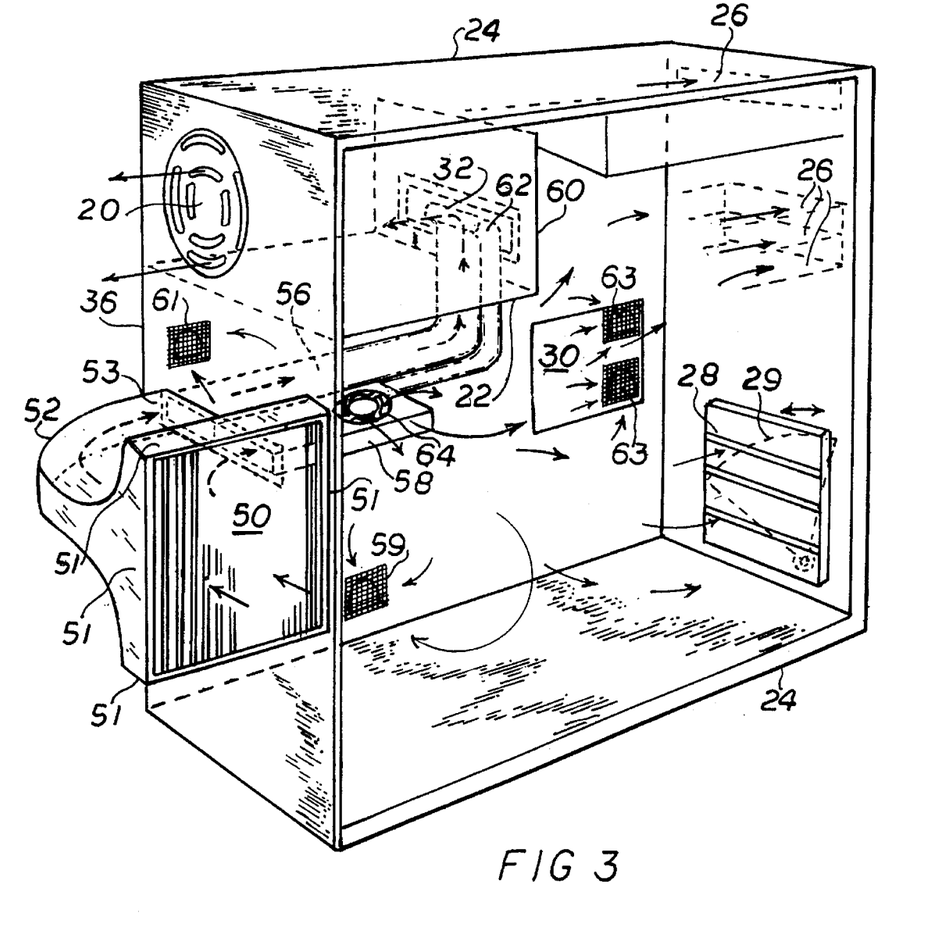
FIG. 3 is a perspective view of a dual airflow system of the present invention, which filters dust from the air and conveys it through two passageways within the enclosure, with side of computer shown removed for clarity.

DETAILED DESCRIPTION OF TWIN-AIRFLOW COOLING SYSTEM—FIRST EMBODIMENT—FIG. 3

FIG. 3 shows a twin airflow cooling system comprising an externally mounted air filter 50. The filter is removably mounted within four retaining walls 51, which form an integral part of a curved hollow air transfer bracket 52. Hollow bracket 52 has a distal end 53 which is attached to and fitted opposite one of the several available rectangular slots 54 shown in FIGS. 1 and 2, which can be opened on rear panel 36. Filter 50, (FIG. 3) is of the concertina or zig-zag type filter, measuring 100 mm×100 mm (4"×4"). This filter has approximately 1613 sq. cm. (250 sq. ") of filter surface area, through which air must pass before reaching the confines of enclosure 24. The filter insert can be easily removed and replaced with a new one. The body of the filter and bracket, 50 and 52 can be made of plastic or any other suitable material and attached to the computer enclosure by any convenient means.

Hollow bracket 52 is fitted to the 'outside' and cooperates with two side-by-side air passageways 56 and 58, attached to the 'inside' of the computer enclosure 24. Passageway 56 lies on a horizontal plane and extends along and underneath the power supply housing 22, until it comes opposite end wall 60 (FIG. 3). It is then bent upward into a 90 degree angle and proceeds vertically until its end 62 is opposite grill 32, wherein it is again bent into a 90 degrees angle so that its open end 62 lies opposite, and cooperates with wall 60 and grill 32, of the power supply housing. Thus, power supply housing and its enclosed components are provided with a separate supply of dust-free filtered air for maintaining absolute cleanliness of its components and also adequate cooling.

Passageway 58 also lies on a horizontal plane adjacent passageway 56 and terminates with an induction fan 64, which draws air through filter 50 and induces it into the confines of the computer enclosure. This air will exit through various disc drive slots 26, after passing via microprocessor chip usually positioned at 30. Thus, dust-free air will exit outwardly through slots 26 whereas, in the past dust-laden air was induced inwardly through these same slots.

Passageways 56 and 58, can be made from flexible material and held in place by brackets (not shown) or they can be made from rigid plastics or any other suitable material, and be self-supporting.

As described above, many of the computer components are unavoidably placed in remotely positioned areas, and will therefore receive diminished supplies of fresh cool air. In order to overcome this problem we have increased the airflow to these areas by placing additional air outlet vents 59 and 61 (described below and shown in FIGS. 9–11) in the walls adjacent the remote areas.

It is well known that heat dissipates from a heat source in many ways; such as, conduction, convection and radiation. In this case, air cooling is the most convenient method since it is easier to supply a continuous stream of air to a heat-generating microprocessor chip in a computer, than to attempt to cool it by water.

Accordingly, to ensure that heat-generating microprocessor chip receives adequate cooling, two screened air vents 63 are placed within area 30 adjacent microprocessor chip usually positioned in this area.

In operation, the chip heats, dissipating its heat by radiation into the air in its immediate airspace. The heated air is constantly being moved toward the adjacent air vents due to the difference in air pressure between the air supplied by fan 64 and atmospheric air pressure outside the computer enclosure. Thus the heated air is constantly being removed and replaced by fresh cool air from fan 64. Air under "positive" pressure within the enclosure moves in the direction of a pressure difference, which is in the direction of the air vents where it escapes to mix with air of less pressure outside the enclosure; secondly, while escaping, the air constantly becomes heated by the heat-radiating microprocessor chip, around and over which the air must pass in order to escape, and thirdly, the heat so removed is immediately exited to the outside of the housing, through the vent, where it cannot contaminate (heat up) other components.

SECOND EMBODIMENT, DUAL AIRFLOW SUSTEM—FIGS. 4–8

Figure 4:
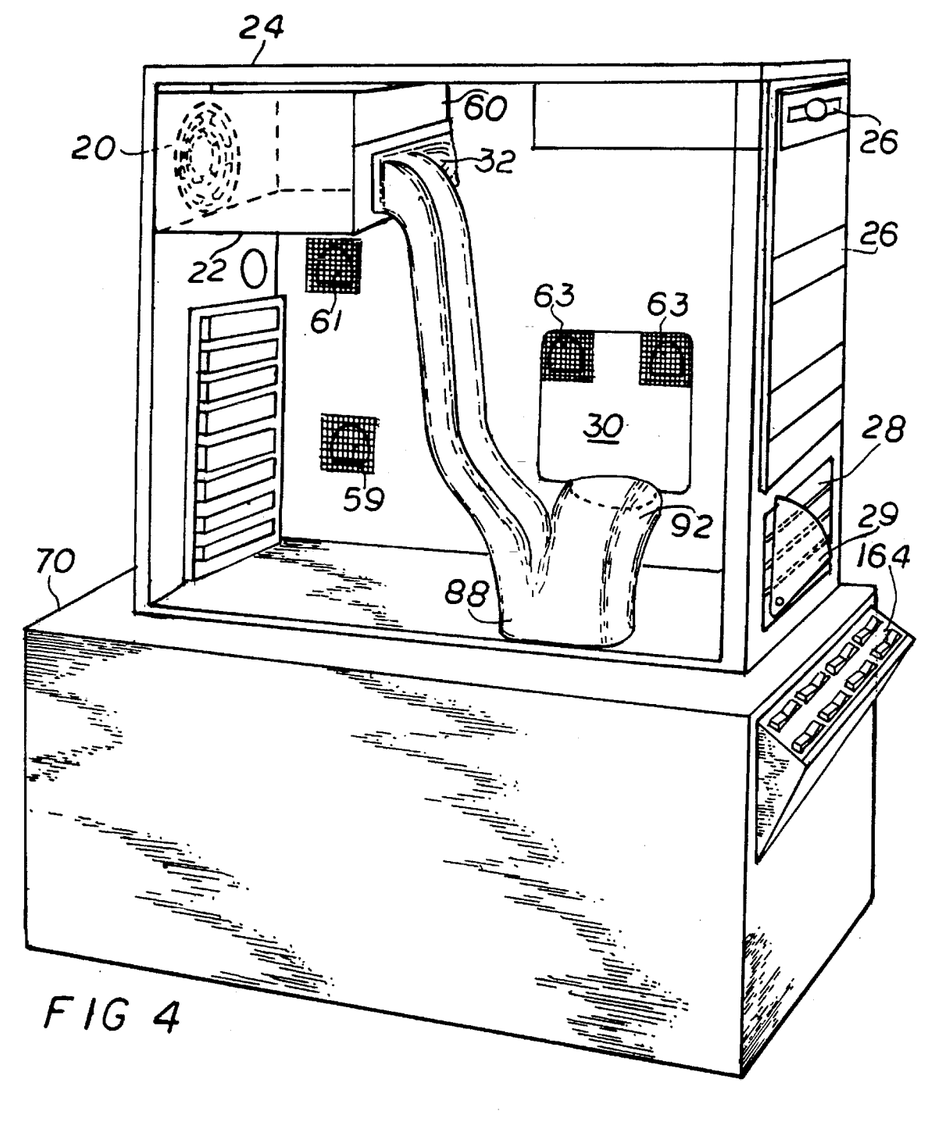
FIG. 4 is a perspective view of a second embodiment comprising a tower-style case enclosing an air-filtering system, which supports a personal computer, and also provides means to transfer cooling air into two passageways within the computer enclosure, with side shown removed for clarity.
Figure 5:
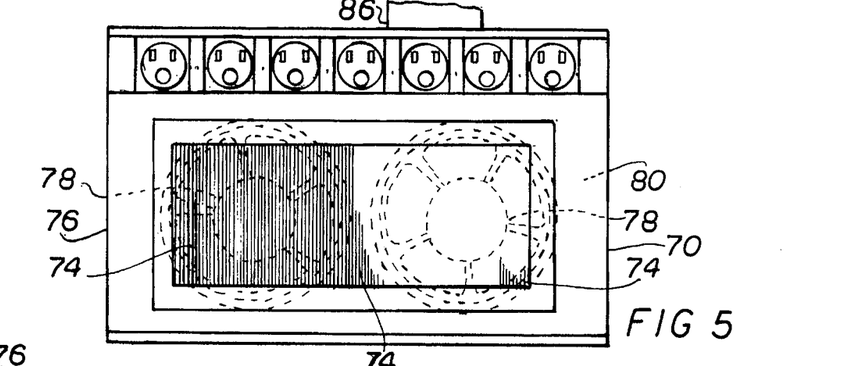
FIG. 5 is a rear view of the tower-style case of FIG. 4, showing portion of a filter and twin fans in broken lines.
Figure 6:
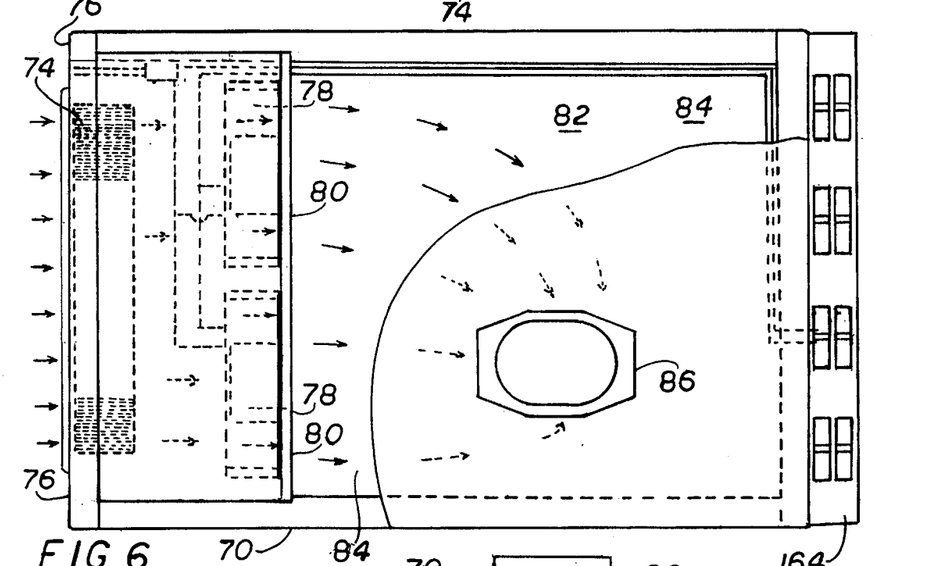
FIG. 6 is a plan view of the top of tower-style case of FIG. 4 showing a portion of top cover removed to show direction of airflow in the second embodiment.
Figure 7:
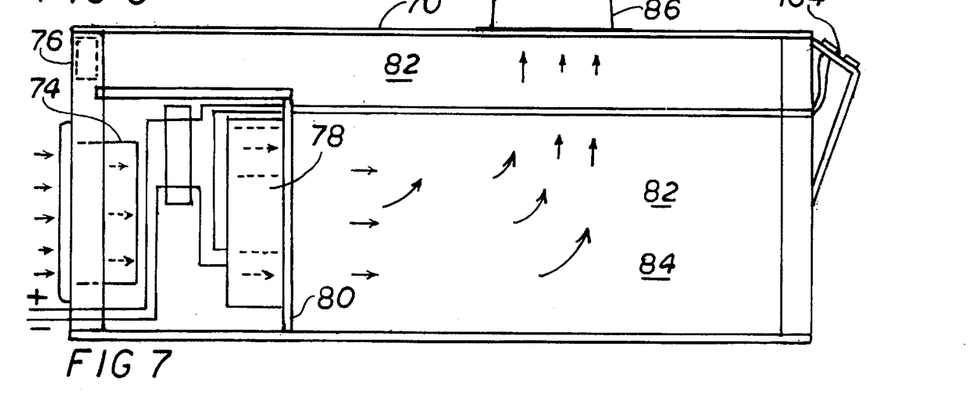
FIG. 7 is a side view of the tower-style case of FIG. 4, with a side removed to expose internal components and the airflow direction, in the second embodiment.

FIG. 4 shows a second embodiment, in which a tower-style case 70 is used to contain an air filtering system, and a support upon which a personal computer 24 is placed. The tower-style case comprises a large, 22 mm, (8.75") wide×9 cm. (3.5") high, concertina or zig zag type filter 74, part of which is shown in FIG. 5. Filter 74 is fitted across the distal or back end 76 of case 70. Filter 74 has a filtering surface area of approximately 3,700 sq. cm (575 sq."). Two induction fans 78 are arranged side by side on a dividing wall 80, (FIG. 5–7) immediately behind filter 74. The fans induce air through filter 74 building up a positive air pressure within space 82 of compartment 84 (FIGS. 6 and 7). Each fan displaces 65 cubic feet of air per minute into compartment 84.

Compartment 84 has an air outlet sleeve 86 (FIGS. 6–8) mounted on top of case 70, which aligns with and forms an airtight connection with an air duct 88 (FIGS. 4 and 8) in the computer enclosure.

Figure 8:
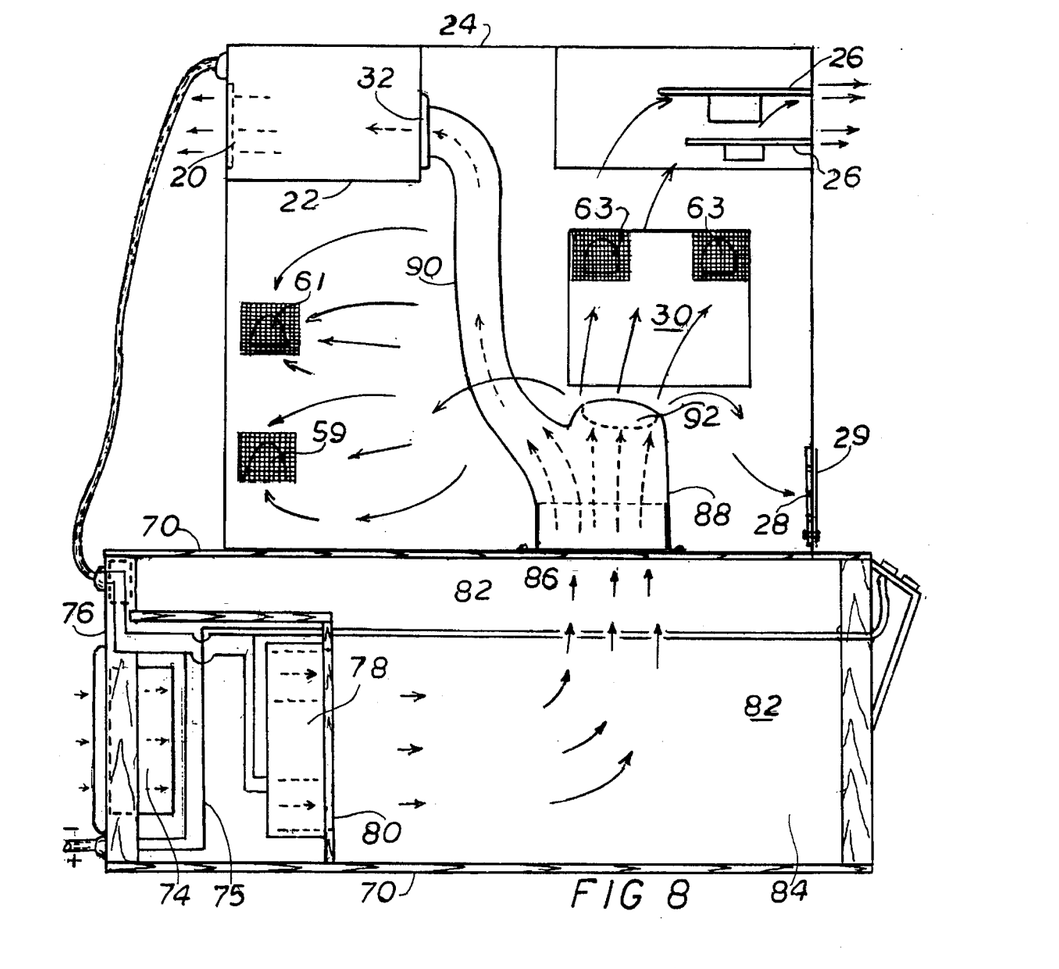
FIG. 8 is a side view of both the tower-style case and the computer of FIG. 4, with the sides removed to expose some of the internal components, some electric wiring, and airflow direction throughout the second embodiment.

Duct 88 is divided into two passageways 90 and 92. Passageway 90 leads to and supplies dust-free air to power supply housing 22 and its components through grill 32, after which the air is exited via exhaust fan 20. If exhaust fan 20 should become inoperative, sufficient air is still provided via passageway 90 from the positive air pressure within tower-style case 70, to adequately cool power supply components.

Air outlet 92 directs a copious supply of air toward and around principle heat generating microprocessor usually positioned at 30, (which could be, in particular, the new PENTIUM chip), after which the air escapes through air vents 63 adjacent the microprocessor, and through various disc drive slots 26 and restricted air vent 28 in the front of the enclosure. Air also escapes through air vents 59 and 61 placed in the remote areas under the power supply housing.

Cooling air from passageway 92 provides adequate air to cool all components in the computer enclosure, except those in the power supply housing, which are cooled by the air supply through passageway 90. Air exiting through the various disc drives and the additional air vents makes it impossible for any dust laden air to enter the computer enclosure through any opening.

Figures 9, 10, 11A:
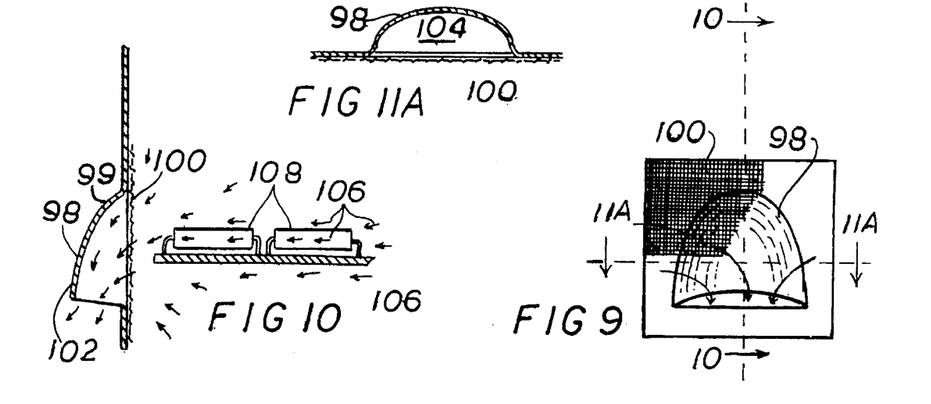
FIG. 9 is an internal side view of a screened air vent.
FIG. 10 is a side sectioned view taken along the line 10—10 of FIG. 9 showing two components and the direction of air exiting through the air vent.
FIG. 11A is a top sectioned view of the air vent taken along the line 11A—11A of FIG. 9.

ADDITIONAL AIR EXIT VENTS—FIGS. 9–11.

As stated above, some components in prior-art personal computers are unavoidably positioned in remote areas and corners of the computer housing. This remoteness is in relation to being distanced-from the point of entry of air entering the enclosure.

As stated, air moves from point of entry, toward point of exit, because there is a pressure difference, which in this case, the point of exit is at the screened air vents 63, adjacent microprocessor usually located at 30, disc drive slots 26 and adjustable air vent 28 in the 'front' panel of the enclosure. However, the remotely placed components are in the 'rear' lower areas, under the power supply housing, and it is these components which receive insufficient circulation of air simply because there is no air exit vent in this area except a small Keyboard outlet usually plugged in.

In accordance with the present invention, in order to provide more air circulation for these remotely placed components, two additional air exit vents 59 and 61 (FIG. 8) are provided in the wall of the computer enclosure in this area. The air vents allow air to pass out through the vents, thus providing an increased air circulation into these remote areas.

Air vents 59 and 61 are protected against entry of insects, or other objects, by covering the vents on the inside with wire screen 100 (FIGS. 8–11) and by providing an awning 98 on the outside for shielding the vent.

Each vent has an open space of about 1–3 sq. cm, (0.155 0.465 sq.") or as small or large as is required. The vents are covered with a fine wire screen of approximately 20 to 40 mesh, which can be adhesively or otherwise attached to the inside of the computer enclosure. Alternatively a screen can be placed on the outside, or any other kind of insect-restrictor placed in or onto the air vent. The screen should not be so closely woven as to offer unneccessary restriction to the outward flow of air through the vent, which would tend to thwart the cooling effects of the increased air flow in the region.

The hood or awning 98 (FIGS. 9–11) is formed from the enclosure metal on the outside to protect the vent opening and wire mesh from damage and also to direct any unintentional spillage of liquid from entering the enclosure. Alternatively, awning 98 can be made separately and attached by any convenient means.

FIG. 9 shows a perspective inside view of awning 98 and part of wire mesh 100. FIG. 10 shows a side view taken along the line 10—10 of FIG. 9, in which awning 98 is shown joined at its top end 99 and open at its bottom end 102. FIG. 11A shows a sectional view taken along the line 11A—11A of FIG. 9 in which awning 98 is shown pressed outward to form an opening 104, on the outside of wire mesh 100. Arrows 106 (FIG. 10) show the direction of escaping air from inside the enclosure over and around components 108 through wire mesh 100 to the ambient air outside the enclosure. Air vents and awnings can be stamped into the enclosure metal, or holes can be punched or drilled, and the awnings made separately and welded in place.

Figures 11B, 11C, 11D, 12:
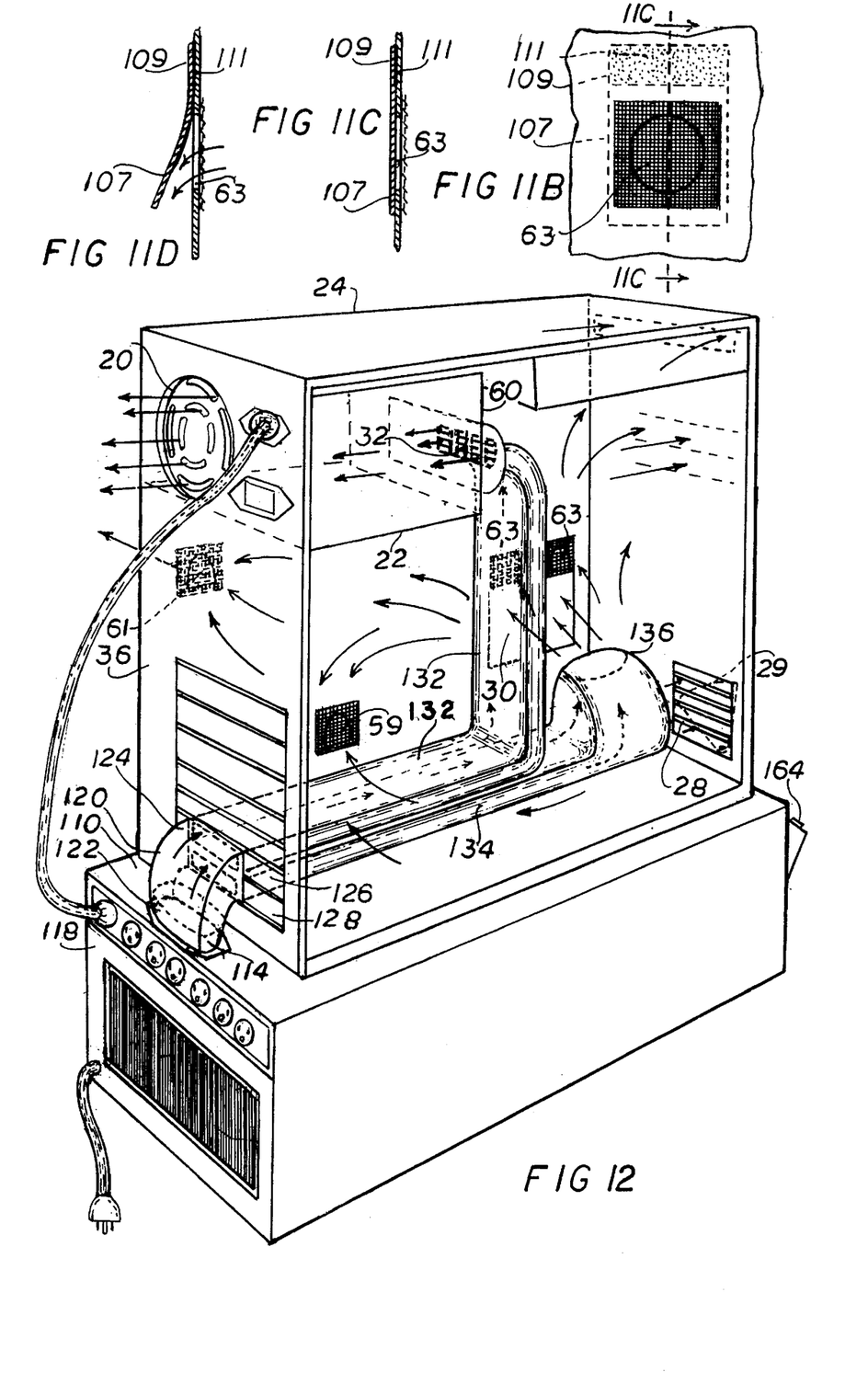
FIG. 11B is an internal side view on an alternative method of protecting a screened air vent.
FIG. 11C is a sectional view taken along the line 11C—11C of FIG. 11B.
FIG. 11D is a sectional view showing air passing through the vent of FIG. 11B.
FIG. 12 is a perspective back/right side view of a third embodiment showing an alternative airflow arrangement comprising an external air transfer elbow connecting onto two internal air passageways in the computer, with the computer enclosure side shown removed for clarity.

ALTERNATIVE PROTECTION FOR SCREENED AIR VENTS—FIGS. 11B–11D.

Alternatively, the screened air vent shown in FIGS. 9–11A, or made round as shown in FIGS 11B–11D, can be protected on the outside of the enclosure by a flexible 'flap valve' 107 (FIGS. 11B–11D).

Flap valve 107 replaces awning 98, (FIGS. 9–11A), and is less costly to produce. Flap valve 107 (FIG. 11B) comprises a flat tongue 107 of flexible material, such as sheet rubber (or any other suitable material) which is placed over the air vent, on the outside, and is adhesively attached only at its top end 109, by adhesive 111, Thus the lower end 113 is loosely overhanging the vent. In operation, positive air pressure within the enclosure escapes through the screened air vent 63, by opening the flexible flap valve 107 from its seating against air vent 63 as shown in sectional view, FIG. 11D.

Thus, flap valve tongue 107, overhangs the air vent and protects it and the screen against entry of unintentionally spilled liquid, as is done by awning 98, shown in FIGS. 9–11A. When the computer is not in use, the flap-valve returns to its seat by gravity thus closing the opening of the air vent, as shown in FIG. 11C.

ALTERNATIVE ARRANGEMENT FOR AIR PASSAGEWAYS, SECOND EMBODIMENT—FIG. 12.

FIG. 12 shows an alternative arrangement of air passageways used in a tower style case 110 on which is placed a personal computer 24. Case 110 is fitted with the same air filter, and induction fans, as described in Second Embodiment, (FIGS. 5 and 6), except that the method of transferring dust-free air from case 110 to personal computer 24 is changed.

FIG. 12 shows tower style case 110 having an air outlet sleeve 114 mounted on top of case 110, close to rear panel 36. Sleeve 114 forms an airtight connection with an air transfer elbow 120 having a first end 122 and a second end 124. First end 122 fits tightly onto sleeve 114 and its second end 124 attaches to two rectangular slots 126 and 128 in rear panel 36 (FIGS. 12). Second end 124 connects to, and aligns with, two air passageways 132 and 134 within computer housing 24.

Passageway 132 transfers air to power supply housing through grill 32 in the power supply housing 22. Passageway 134 lies under and parallel to passageway 132, terminating in a curved air outlet 136. Air outlet 136 directs a copious supply of cooling air toward microprocessor usually positioned at 30, and also two screened air vents 63. Additional air vents 59 and 61, are positioned in the enclosure wall under power supply housing 22.

Figure 13:
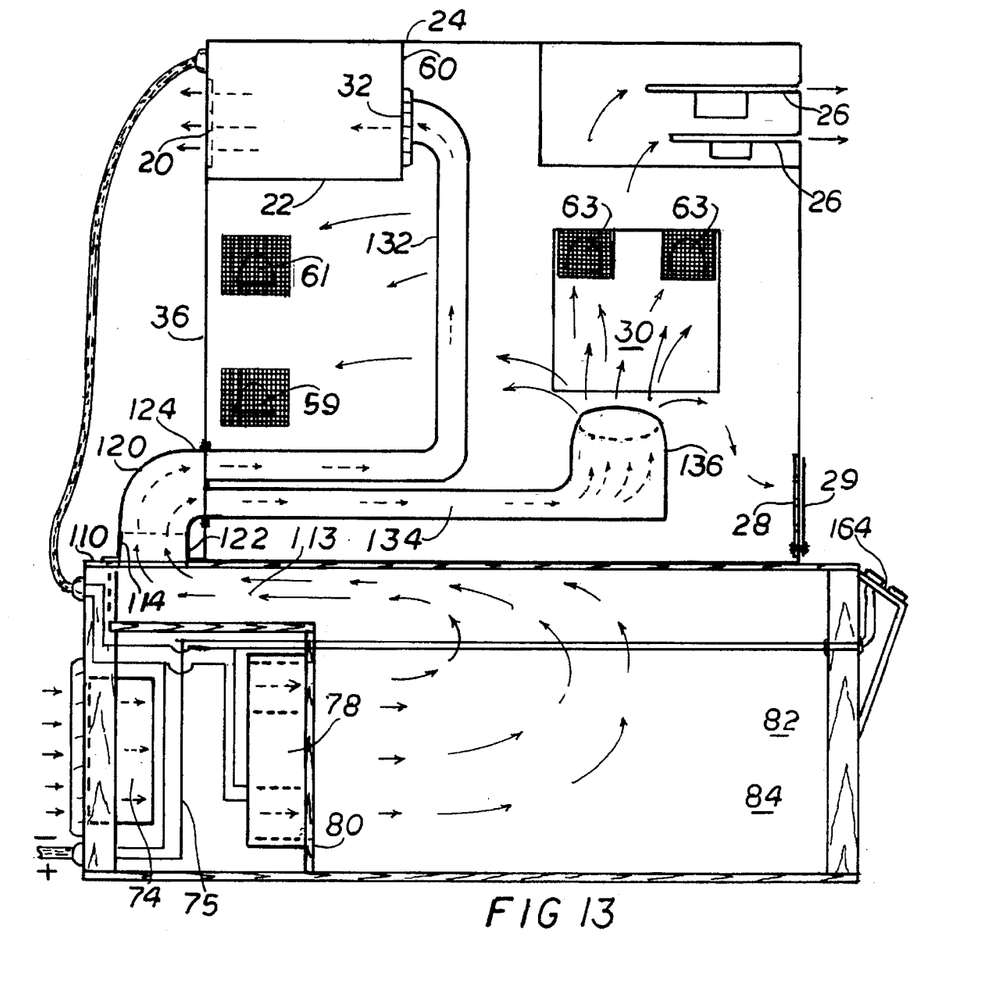
FIG. 13 is a side view of FIG. 12 with side walls removed to expose the airflow from the tower-style case into, and through the computer, including four additional air vents. Also some electric wiring of the filter assembly, and electric connection to the computer.

FIG. 13 is a side view and clearly shows the direction of air flow from compartment 84, through passageway 113, sleeve 114, and through elbow 120, hence into two passageways 132 and 134. Passageway 132 leads to power supply housing, and passageway 134 leads to outlet 136 directing air toward microprocessor usually positioned at 30 and two screened air vents 63.

The advantage of the alternative arrangement of air distribution from the tower style case to the computer enclosure, shown in FIG. 12, as compared to the arrangement shown in FIG. 8, is that the bottom of the computer enclosure does not have to be redesigned with, or have a large air hole cut out at sleeve 88 (FIG. 8), as is required in the first embodiment.

Tower Style Case and Computer Enclosure Combination

Although the present invention herein described and shown in FIGS. 4–16 comprises a tower style case supporting a personal computer, these two parts can be made as one part (not shown) thus providing all of the advantages of the present invention, including; 1. "dust-free" air under, 2. "positive" air pressure, with 3. dual passageway cooling system, 4. optimally placed screened air vents, 5. an "adjustable" air outlet vent, 6. peripheral units "control panel" in one complete unit.

The filtered air cooling systems herein described and shown illustrated, is not reserved solely for personal computers, but is appropriate for other electronically operated machines and devices where cleanliness and/or cooling of the components is considered necessary for trouble-free operation.

ELECTRICAL CIRCUITS, FIGS. 8, 13–16

FIGS. 8 and 13 shows a wiring circuit 75 within the filter assembly.

Figure 14:
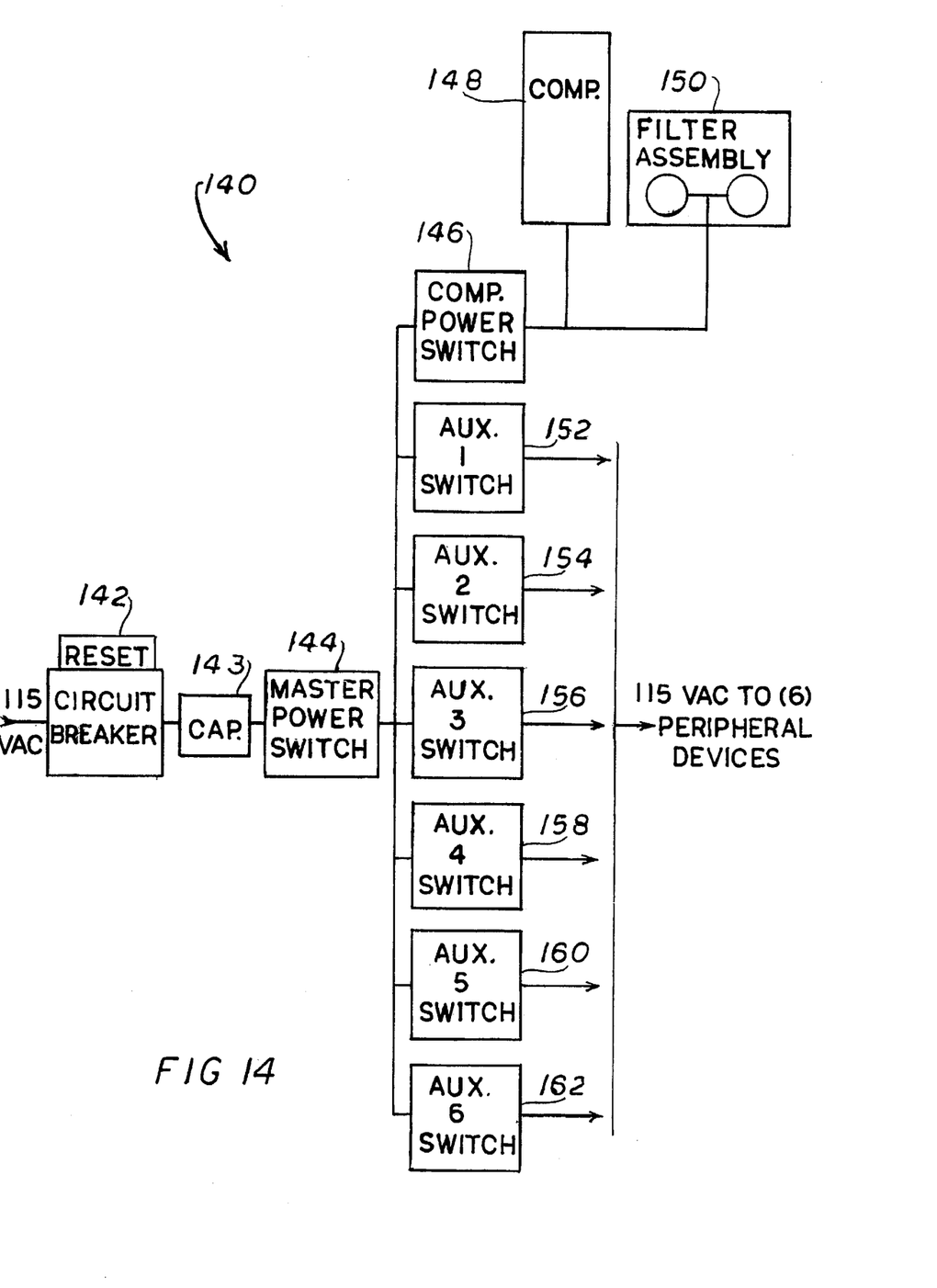
FIG. 14 is a diagramatic view of an electrical circuit used in second and third embodiments.

Electric diagram shown in FIG. 14 is used in both variations of the tower-style case and personal computer as shown in FIG. 8 and in FIG. 12.

FIG. 14 shows an electrical diagram 140 comprising three components connected in series; these are, a 115 VAC supply to a circuit breaker capable of being reset 142, a capacitor 143, and master power switch 144. These are connected in parallel to an array of seven individual on/off controlling switches. Computer power switch 146, for providing power to both computer 148 and filter assembly 150. The remaining six power switches can be used for providing power to any or all of the following: auxiliary 1) switch 152, for providing power to a printer; auxiliary 2) switch 154, for providing power to a scanner; auxiliary 3) switch 156, for providing power to an external modem; auxiliary 4) switch 158, for providing power to an external tape back up device, auxiliary 5 switch, 160 for providing power to a monitor and; auxiliary 6 switch 162 for providing power to anything else that accepts 115 VAC.

Computer power switch 146 provides power to both computer and filter assembly cooling system simultaneously, thereby assuring that computer 148 and cooling filter assembly 150 will always be "on" or "off" at the same time.

It will be realized that, any auxiliary switches which are being used to provide power for peripheral devices can be left in the "on" position at the end of a work period, and all devices switched "off" by the master power switch. When the next work period is commenced, switching master power switch "on" simultaneously energizes all such peripheral devices left in the "on" position previously.

Figures 15, 16:
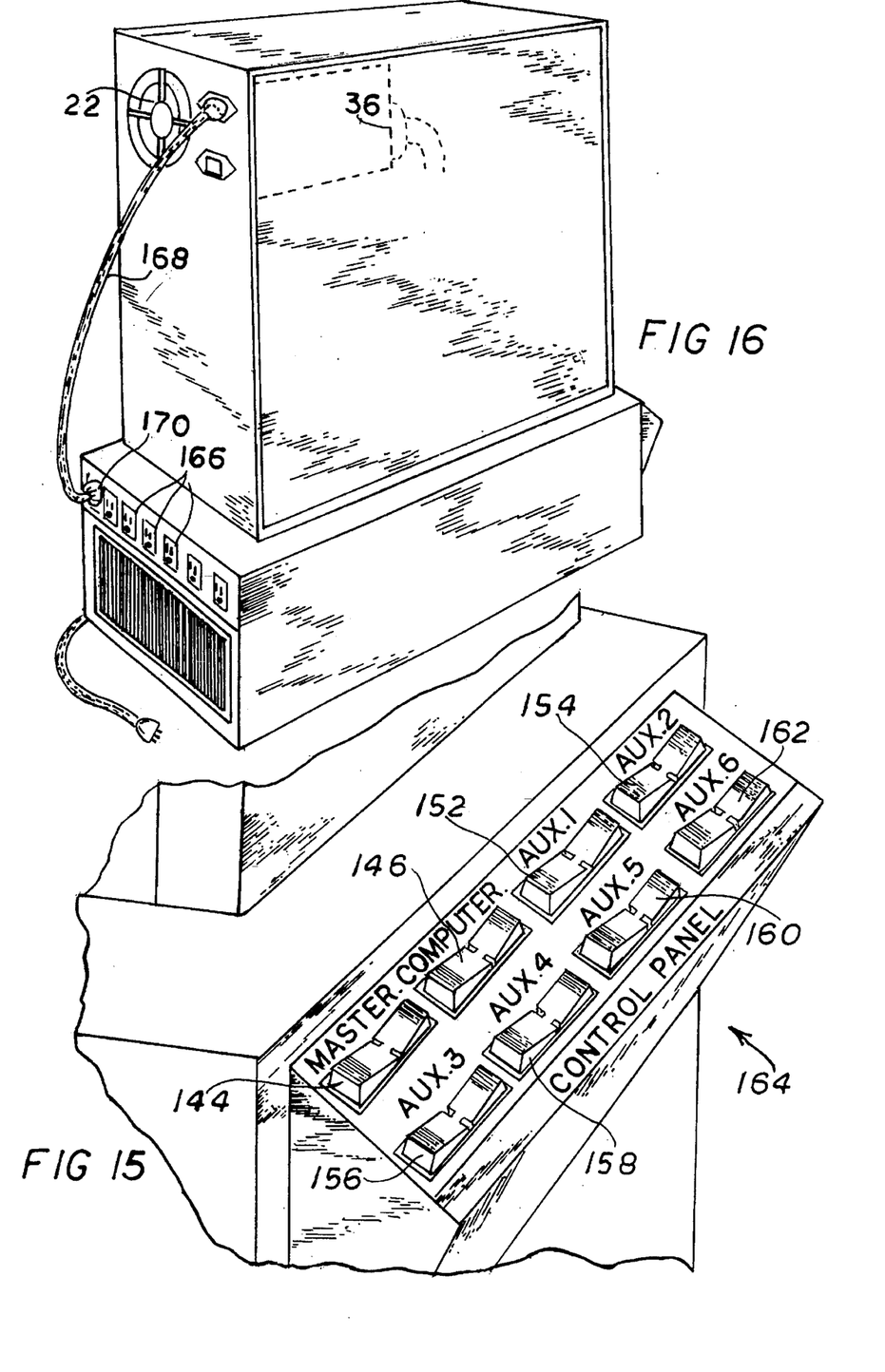
FIG. 15 is a perspective view of the control panel used in the second and third embodiments.
FIG. 16 a perspective rear view of the second embodiment, showing electric lead from the plug-in socket to the computer power supply.

FIG. 15 shows the arrangement of the eight switches in the control panel 164 at the front of the tower-style case. FIG. 16 shows the arrangement of the 115 VAC outlets 166 at the rear of the tower style case and connecting cord 168 connecting outlet 170, to computer power supply.

Summary, Ramification and Scope.

Thus the reader will see that we have provided a filtered twin air cooling system, which solves the numerous problems associated with the air cooling systems used in prior-art personal computers, in particular we have provided a cooling system which prevents heat generating chips from becoming encrusted with dust, then overheating and inoperative, thereby causing loss of production time, disruption to industry, and needing costly repairs. We have provided a dual air cooling system, which not only provides separate cooling for the power supply, but provides more directed and positive cooling to vital components, and also provides practical cooling for other more isolated components in remote areas.

In addition we have provided a fool-proof electrical system which provides one computer power switch to automatically energizes both computer and cooling system, thereby protecting the computer from any damage which could otherwise be caused by independent switches and a forgetful operator.

We have also provided a tower style case upon which a personal computer is placed, and which houses a large surface air filter, and two large volume induction fans. We have provided means to transfer air from the case air compartment to the computer through passageways which will transfer the air to components most needing copious volumes of cooling air, such as the PENTIUM chip. We have provided a system which removes micro-fine dust, which receives its air supply from behind the computer where there is less likely to be dust and vapors from liquids. We have provided a system which gives positive air pressure within the computer enclosure, and provides adequate volume to cool all components, even if one induction fan, or the exhaust fan were to become inoperative. We have provided a clean-air system in which the filters can be changed regularly or when necessary. We have provided a cooling system whereby it is impossible for dust-laden air to enter through any opening in the computer enclosure, and whereby clean air is in fact escaping outwardly. We have also provided a dual air cooling system which ensures that the power supply is cooled separately from the cooling of the computer components.

While the above description contains many specificities, the reader should not construe these as limitations on the scope of the invention, but merely as exemplifications of preferred embodiments thereof. Those skilled in the art will envision that many other possible variations are within its scope. For example, skilled artisans will readily be able to change the dimensions and number of induction fans or the volume of air supplied and or change the number of passageways, or the passageway shapes, their outlet sizes and their outlet positions, and volume of air supplied.

Accordingly, the reader is requested to determine the scope of the invention by the appended claim and their legal equivalents, and not be the examples which have been given.

We claim:

1. A cooling system in a personal computer, said personal computer including an electrical power supply and at least one microprocessor retained in a computer housing, said cooling system comprising:

a cooling system housing having a top and a bottom, said cooling system housing supporting said computer housing on the top thereof;

at least one air blower means located in said cooling system housing, said blower means inducing a positive air pressure within said computer housing;

at least one air filter element in a serial arrangement with said blower means and located in said cooling system housing, said air filter element located upstream of said computer housing, such that said blower means delivers a stream of filtered air to said computer housing;

means for directing said stream of filtered air from said at least one air blower means in said cooling system housing to said computer housing, said stream of filtered air directing means comprising an air outlet port formed through the top of said cooling system housing in fluid connection with an air inlet port disposed in the bottom of said computer housing; and means for dividing said stream of filtered air into at least two flow paths, including a first flow path and a second flow path, said dividing means comprising an air duct within said computer housing and in fluid connection with said air inlet port, said air duct having a first branch directing filtered air from said blower means, along said first flow path, to said electrical power supply and a second branch directing filtered air from said blower means, along said second flow path, to said at least one microprocessor and to other electrical components retained within said computer housing.

2. The cooling system of claim 1 wherein said at least one filter element has a surface area of approximately 1613 square centimeters.

3. The cooling system of claim 1 wherein said at least one filter element comprises a concertia or zig-zag type filter.

4. The cooling system of claim 1 further comprising a second air blower means within said first flow path for inducing an air flow past said electrical power supply within said computer housing.

5. The cooling system of claim 1 further comprising at least one air outlet vent formed through said computer housing, said at least one air outlet vent being located proximate said at least one microprocessor so as to induce a flow of air past said at least one microprocessor.

6. The cooling system of claim 5 wherein said at least one air outlet vent through said computer housing further comprises a flapper valve means for allowing air to flow through said at least one air outlet vent from the interior of said computer housing to the exterior of said computer housing and for preventing air from flowing through said at least one air outlet vent from the exterior of said computer housing to the interior of said computer housing.

7. The cooling system of claim 1 further comprising a switch means for simultaneously supplying electrical power to said personal computer and said at least once air blower means, such that said at least one air blower means will always operate whenever said personal computer operates.

* * * * *